United States Patent
Racz

(10) Patent No.: US 11,300,463 B2
(45) Date of Patent: Apr. 12, 2022

(54) OPTICAL ROTARY ANGLE SENSOR FOR AN ELECTRIC POWER ASSISTED STEERING SYSTEM OF A MOTOR VEHICLE

(71) Applicants: thyssenkrupp AG, Essen (DE); THYSSENKRUPP PRESTA AG, Eschen (LI)

(72) Inventor: Gergely Racz, Budapest (HU)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 789 days.

(21) Appl. No.: 16/095,890

(22) PCT Filed: Apr. 29, 2016

(86) PCT No.: PCT/EP2016/059675
§ 371 (c)(1),
(2) Date: Oct. 23, 2018

(87) PCT Pub. No.: WO2017/186310
PCT Pub. Date: Nov. 2, 2017

(65) Prior Publication Data
US 2021/0223124 A1 Jul. 22, 2021

(51) Int. Cl.
*G01L 3/08* (2006.01)
*B62D 5/04* (2006.01)
*G01D 5/347* (2006.01)

(52) U.S. Cl.
CPC .............. *G01L 3/08* (2013.01); *B62D 5/04* (2013.01); *G01D 5/34715* (2013.01)

(58) Field of Classification Search
CPC ......... G01L 3/08; B62D 5/04; G01D 5/34715
See application file for complete search history.

(56) References Cited

U.S. PATENT DOCUMENTS 5,107,107 A * 4/1992 Osborne ............ G01D 5/34715
250/231.14
7,327,056 B2 2/2008 Van Brocklin
(Continued)

FOREIGN PATENT DOCUMENTS

CA  2350553 A1 * 5/2000 ............. G01D 5/347
CN  1618008 A    5/2005
(Continued)

OTHER PUBLICATIONS

JP 2003315096 Ito Koichi, Absolute Rotation Angle Detection Device and Steering Angle Detection Device of Steering Wheel of Vehicle, Nov. 6, 2003 (Year: 2003).*

(Continued)

*Primary Examiner* — Giovanni Astacio-Oquendo
*Assistant Examiner* — Carl F. R. Tchatchouang
(74) *Attorney, Agent, or Firm* — thyssenkrupp North America, LLC

(57) ABSTRACT

A rotary angle sensor for an electric power assisted steering system of a motor vehicle, wherein the rotary angle sensor comprises an optical sensor unit with a light source, optical components and a photodetector and a disc with an optical pattern, wherein the optical sensor unit and the disc are configured to rotate relative to each other around a rotary axis, and wherein the optical sensor unit is configured such that light reflected from the optical pattern is measured by the photodetector, wherein the optical pattern comprises steps and spaces separating the steps, such that light reflected by steps and spaces destructively interferes leading to an intensity modulation of the reflected light according to an optical pattern which encodes a binary type code for the rotary angle of the disc.

13 Claims, 4 Drawing Sheets

(56) References Cited

U.S. PATENT DOCUMENTS

| | | | | |
|---|---|---|---|---|
| 2005/0081392 A1* | 4/2005 | Noltemeyer | ....... | G01D 5/34715 33/1 PT |
| 2009/0152452 A1 | 6/2009 | Lee | | |
| 2013/0019693 A1* | 1/2013 | Klimenko | ............... | G01L 3/104 73/862.331 |
| 2014/0360804 A1* | 12/2014 | Oguchi | ..................... | G01L 3/12 180/446 |

FOREIGN PATENT DOCUMENTS

| | | | | |
|---|---|---|---|---|
| CN | 1655000 A | 8/2005 | | |
| CN | 103197511 A | 7/2013 | | |
| CN | 103389154 A | 11/2013 | | |
| CN | 102667435 B * | 6/2015 | ............. | G01L 5/221 |
| DE | 3309779 A | 10/1983 | | |
| DE | 3309779 A1 * | 10/1983 | ......... | G11B 7/24085 |
| DE | 19745823 A1 * | 4/1999 | ............. | G01D 5/347 |
| DE | 19855064 A | 5/2000 | | |
| DE | 10018496 A | 10/2001 | | |
| EP | 0997707 A1 * | 5/2000 | ......... | G01D 5/34784 |
| FR | 2828278 A1 * | 2/2003 | ............. | G01L 5/221 |
| WO | 0119665 A | 3/2001 | | |
| WO | WO-2007048611 A1 * | 5/2007 | ......... | G02B 27/4255 |
| WO | WO-2016050382 A1 * | 4/2016 | ............. | B62D 5/008 |

OTHER PUBLICATIONS

DE 10201501281 Schwenkert Michael, Optical Rotation Angle Sensor for a Motor Vehicle, System With an Optical Rotation Angle Sensor and Method for Determining a Rotation Angle, Publication date: Apr. 6, 2017 Filling date: Oct. 2, 2015 (Year: 2015).*

The International Search Report issued in PCT/EP2016/059675, dated Jun. 14, 2016 (mailed Jun. 20, 2016).

* cited by examiner

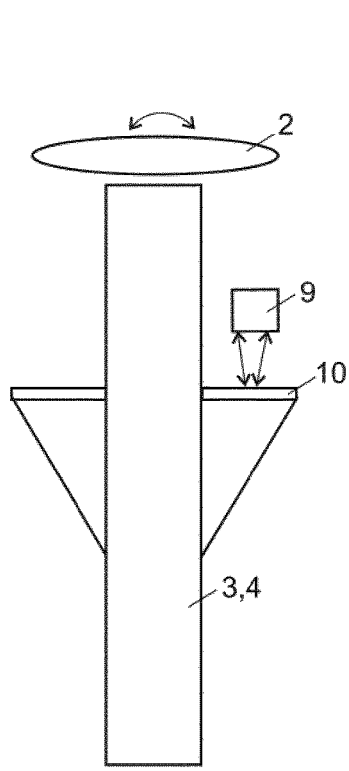
Figure 5
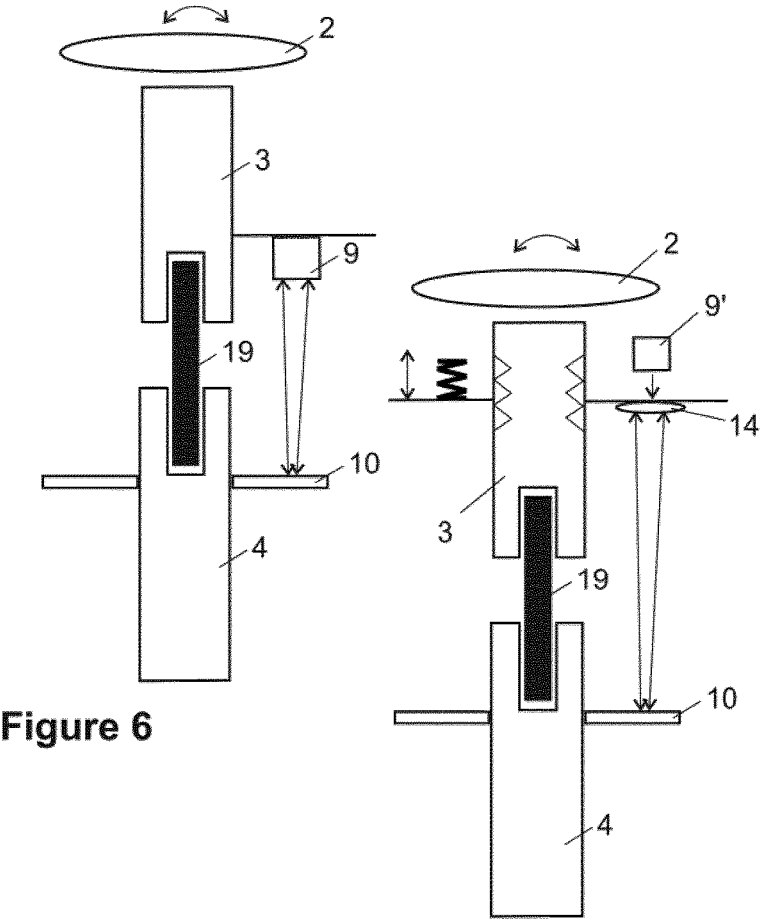
Figure 6
Figure 7
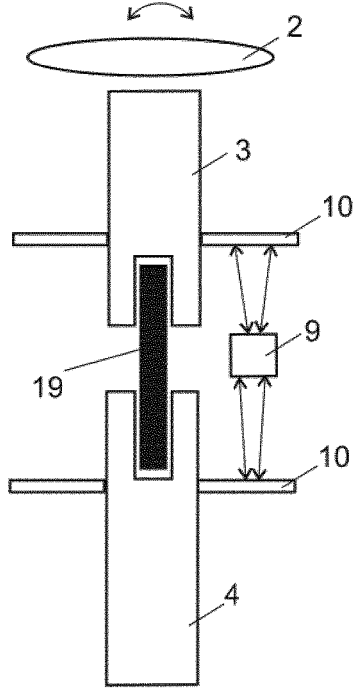
Figure 8
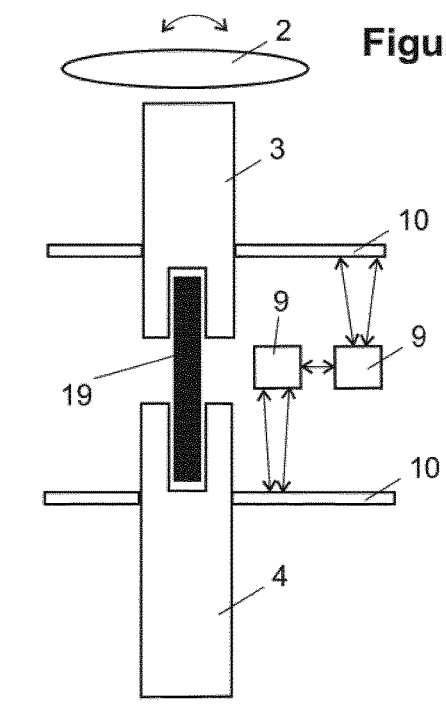
Figure 9

OPTICAL ROTARY ANGLE SENSOR FOR AN ELECTRIC POWER ASSISTED STEERING SYSTEM OF A MOTOR VEHICLE

CROSS REFERENCE TO RELATED APPLICATION

This application is a U.S. National Stage Entry of International Patent Application Serial Number PCT/EP2016/059675, filed Apr. 29, 2016, the entire contents of which are incorporated herein by reference.

FIELD

The present disclosure generally relates to a rotary angle sensor for an electric power assisted steering system of a motor vehicle.

BACKGROUND

Rotary angle sensors have the ability to collectively measure steering wheel angle and speed with a number of steering wheel turns. In addition for differential torque measurement, a torque sensor is used in an electric power assisted steering system, which comprises a ring magnet which is fixed to the upper steering shaft and flux conductor parts which are fixed to the lower steering shaft. The torque sensor measures the relative shift angle between two rotating shafts of the steering column linked by a torsion bar. This angular data is converted into a voltage output and is fed to an electronic control unit of the electric power assisted steering system to determine how much power assistance is required. Furthermore, the electric motor of the electric power assisted steering system is provided with a rotor position sensor attached to the motor shaft.

Besides magnetic sensors, optical sensors are known. Current optical steering angle sensors are expensive as they use image sensors or multiple light sources. A disadvantage of commonly used rotor position sensors is, that they require counter to store the revolution number.

US 2014/0360804 A1 discloses an optical torque sensor, wherein the torsion between the two shafts is read out in an analogue way based on measured polarization of transmissive light or reflected light.

U.S. Pat. No. 7,327,056 B2 discloses a pattern readable for sensing a rotational speed of a motor shaft, wherein the marks in the pattern have a different reflectivity than the spaces and a photodetector receives the reflected light.

Thus a need exists for an improved and simplified optical rotary angle sensor for an electric power assisted steering system of a motor vehicle with a high resolution which can provide signals after battery switch off.

BRIEF DESCRIPTION OF THE FIGURES

FIG. 5 is a schematic view of the arrangement of the sensor on a steering shaft.

FIG. 6 is a schematic view of the arrangement of the sensor as a torque sensor.

FIG. 7 is a schematic view of the arrangement of FIG. 6, whereas the sensor is moveable on a thread of the steering shaft.

FIG. 8 is a schematic view of the arrangement of a sensor, which detects the torsion of two steering shafts.

FIG. 9 is a schematic view of the arrangement of two sensors to detect rotation of the upper and lower steering shaft, respectively.

DETAILED DESCRIPTION

Figure 1:
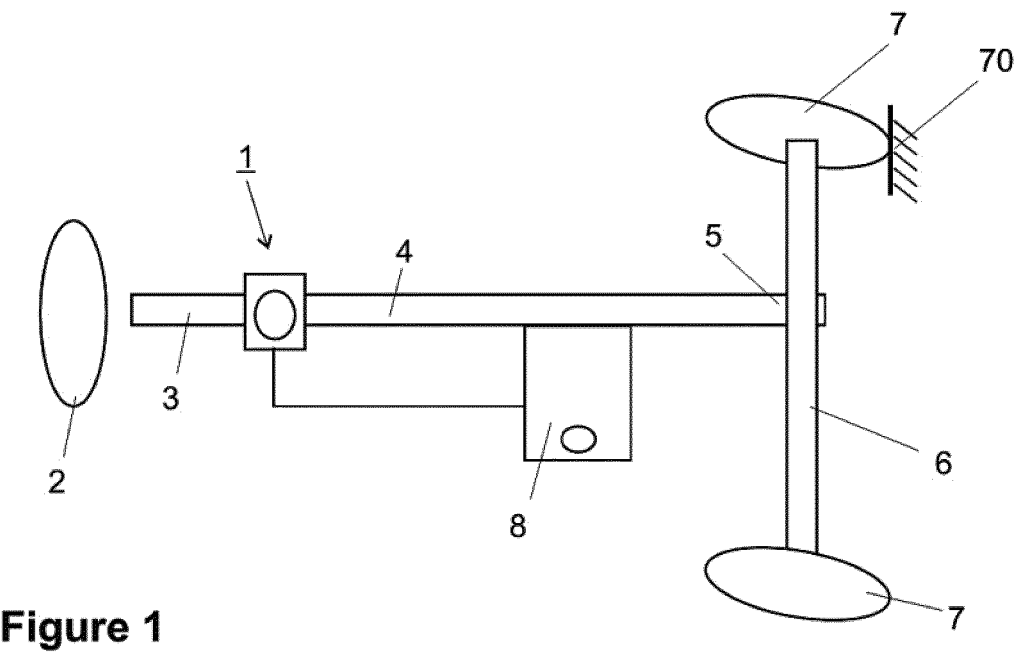
FIG. 1 is a schematic view of an electric power steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A rotary angle sensor for an electric power assisted steering system of a motor vehicle, is provided, the rotary angle sensor comprises an optical sensor unit with a light source, optical components and a photodetector and a disc with an optical pattern, wherein the optical sensor unit and the disc are arranged in such a way, that they are able to rotate relative to each other around a rotary axis, and wherein the optical sensor unit is built in such a way, that light reflected from the optical pattern is measured by the photodetector, wherein the optical pattern comprises steps and spaces separating the steps, designed such that light reflected by steps and spaces destructively interferes leading to an intensity modulation of the reflected light according to the optical pattern which encodes a binary type code for the rotary angle of the disc. This sensor is very simple and inexpensive compared to image sensors or sensors with multiple light sources. By reading out the optical pattern with the optical sensor unit, the position and the angle of the disc relative to the unit can be determined.

Preferably the light source is a laser or a light-emitting diode (LED) or an integrated encoder IC.

Preferably, the steps and spaces are arranged in a circle or spiral concentric to the rotary axis.

Advantageously, the light has a wavelength which is in a range between the visible light and the infrared light. Preferably the light beam has a wavelength between 230 nm and 800 nm. More preferably the light has a wavelength between 350 nm and 550 nm.

In order to keep the optical sensor unit small and compact, it is preferred, that the optical components include a polarizing prism and a quarter wave plate.

The optical pattern can transmit a binary type code by adjusting the lengths of the steps and of the spaces. The sensitivity of the sensor can be amended by adjusting the radius of the optical pattern and the pattern layout and the density of the pattern. Preferably, the rotary angle sensor is separated into two parts, which are relative to each other moveable along the rotational axis with rotation around that axis in such a way, that the linear motion results in light attenuation, which can be detected by the photodetector and converted into the absolute rotary angle of the disc over multiple turns. This allows to provide right away at start-up of the sensor the absolute steering angle.

Further an actuator can be implemented which provides low resolution at the start-up position of the battery. So a rotary position signal is provided without a storage unit. Further an electric power assisted steering system for assisting steering of a motor vehicle by conferring a support torque generated by an electric motor to a steering mechanism, the electric power steering system comprising a steering column with an upper steering shaft and a lower steering shaft linked by a torsion bar and a rotary angle sensor, as described above, is provided.

Preferably, to measure absolute steering angle, one part of the rotary angle sensor is the optical sensor unit which is arranged apart from a focusing lens, which is fixed to a housing and the other part is the focusing lens, which is moveable along the rotational axis of the steering shaft on a thread of the upper steering shaft. The linear motion and resulting light attenuation are translated into turns of the disc, allowing to measure the absolute steering angle or to detect the actuator position as a start-up signal.

In one embodiment, the rotary angle sensor is a torque sensor, wherein the optical sensor unit is arranged to measure the torsion between the upper steering shaft and the lower steering shaft. In this configuration it is advantageous, when the optical sensor unit is arranged torque-proof to the upper steering shaft and the disc is rotating with the lower steering shaft, wherein the steps and spaces are arranged in a circle or a spiral or radially concentric to the rotary axis.

It is also possible to use two rotary angle sensors to read out one disc arranged on the upper steering shaft and one disc arranged on the lower steering shaft, such that the two disks are rotating together with steering wheel motion, while having an angular offset relative to their torsion. Thereby it is preferred, that the optical patterns of the two discs are arranged concentrically without overlap.

In another embodiment, the rotary angle sensor is a rotor position sensor of the electric motor, wherein the disc is arranged at one end of the motor shaft, and wherein the rotation axis of the motor shaft is equal to the axis of symmetry of the disc and its optical pattern.

Preferred embodiments of the present invention will be described with reference to the drawings. In all figures the same reference signs denote the same components or functionally similar components.

Figure 2:
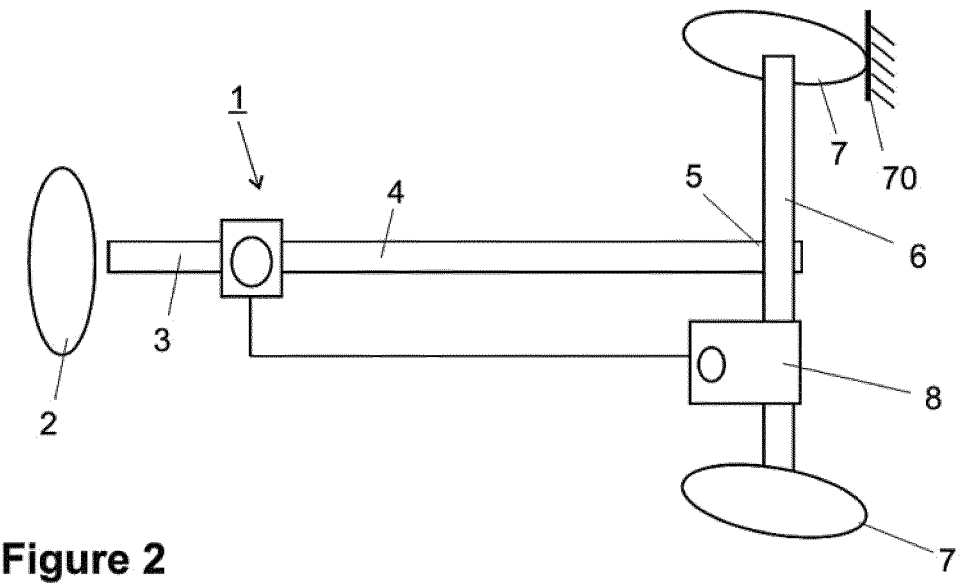
FIG. 2 is a schematic view of an alternative embodiment of an electric power steering system.

FIG. 1 and FIG. 2 are schematic drawings of an electric power steering system 1. A steering wheel 2 is fixed to an upper steering shaft 3, the steering movement of the driver is transmitted via a torsion bar 19 to a lower steering shaft 4. The lower steering shaft 4 is coupled to a rack 6 via a rack-and-pinion mechanism 5. Rotation of the upper and lower steering shaft 3, 4 accompanying a steering operation is converted into a reciprocating linear motion of the toothed rack 6 by the rack-and-pinion mechanism 5. The linear motion of the rack 6 changes the steering angle of the steered road wheels 7. To provide steering assistance, the electric motor 8 can be mounted to the side of the steering shaft 3, shown in FIG. 1 or to the side of the rack 6, shown in FIG. 2. Transferring the assist torque from the motor 8 to the lower steering shaft 4 or the rack 6, respectively, provides the steering assistance.

Figure 3:
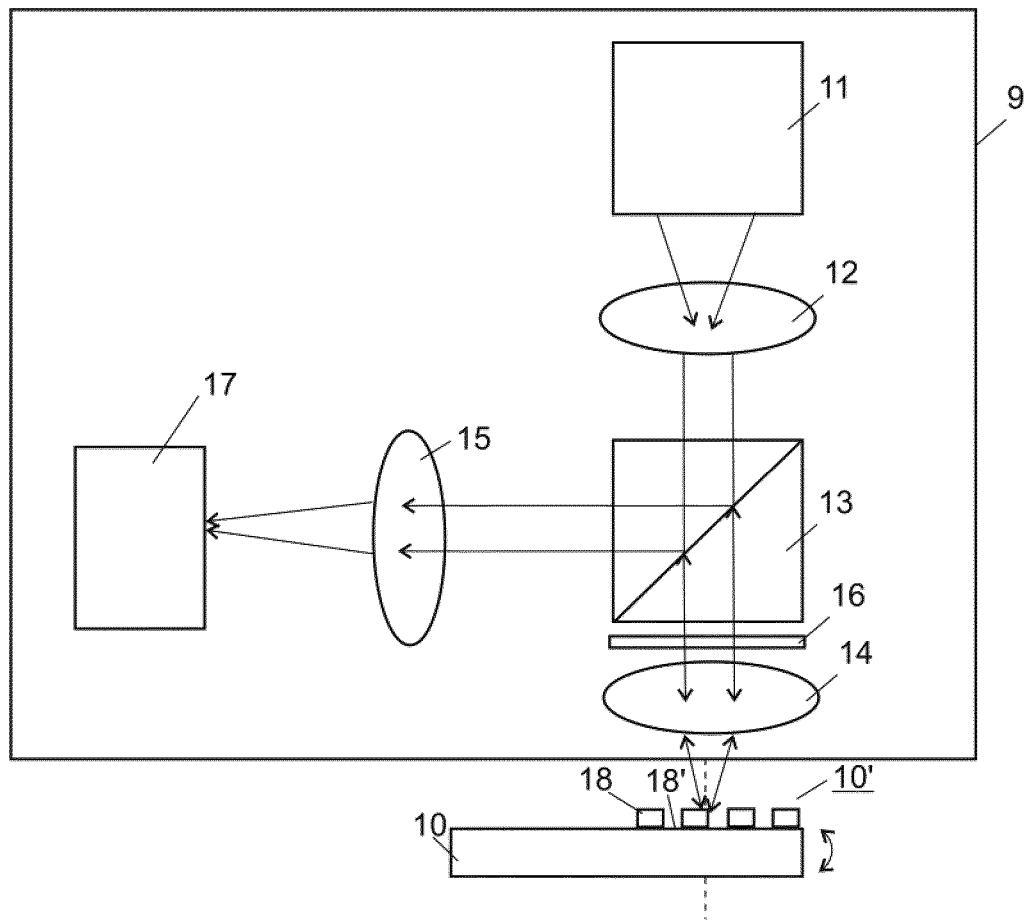
FIG. 3 is a schematic view the functionality of the rotary angle sensor.

The electric power steering systems according to FIGS. 1 and 2 are equipped with a rotary angle sensor. The operation of the rotary angle sensor is explained in FIG. 3.

An optical sensor unit 9 reads out information stored on a disk 10. The optical sensor unit 9 comprises a light source 11, an optical collimator lens 12, a polarizing prism 13, a first and second focusing lens 14, 15, a quarter wave plate 16 and a photodetector 17. Light from the light source 11 is transmitted to the lens 12, functioning as an optical collimator aligning the light. The light source 11 can be a laser or light-emitting diode (LED) or an integrated encoder IC. After that the light impinges on the polarizing prism 13 making the beam plane polarized. Next the light passes through the quarter wave plate 16, that introduces a 90° phase difference between the two components of the electric field vector. The beam is now circularly polarized. After passing through the quarter wave plate 16, the light is focused by the first focusing lens 14. The focused light impinges on the patterned disc 10 and is reflected. Passing through the quarter wave plate 16 a second time introduces a further 90° phase difference between the components, which makes the beam polarized in a plane 90° rotated from that of the beam emerging from the polarizing prism 13. The plan of polarization is now such that the polarizing prism 13 efficiently reflects the returning beam towards the photodetector 17 rather than transmitting the beam back towards the light source 11. The light is focused by the second focusing lens 15 and detected by the photodetector 17 which transforms the light into electrical current. The optical pattern 10' on the disc 10 is formed by steps 18 and spaces 18' between the steps 18. The path difference between a beam reflected from a step 18 and one reflected from a space 18' is half a wave length. This path difference is achieved in the outward and return journey of the beam by a step height of a quarter wavelength. Light from the steps 18 will destructively interfere with light reflected from the spaces 18' and thus appear dark to the photodetector 17. If light is reflected solely from steps or spaces destructive interference does not occur and the photodetector detects light. Thus interrogation of the sensor is based on reflectometry.

The lengths of the steps 18 and of the spaces 18' between them transmit a binary type code, which is processed to reconstitute the absolute angular position. The steps 18 are arranged in a circle or in a spiral. Preferably, the light source beam has a wavelength which is in the range of infrared and visible light.

Figure 4:
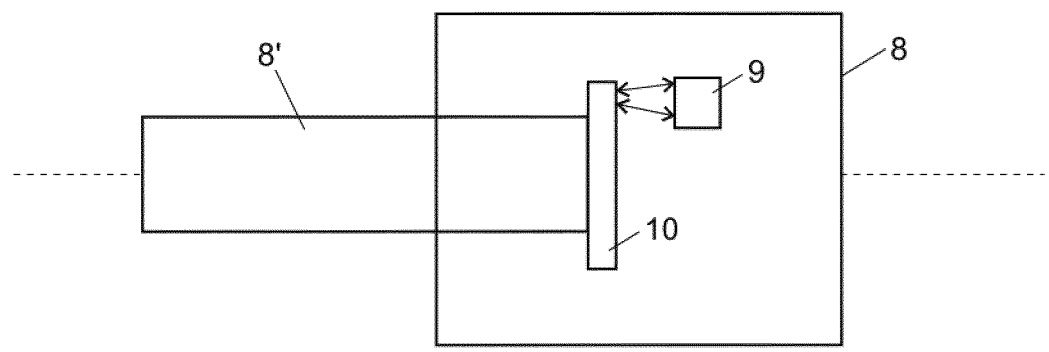
FIG. 4 is a schematic view showing the use of the rotary angle sensor as a rotor position sensor.

The optical rotary angle sensor can also be realized as rotor position sensor of the electric motor 8, as shown in FIG. 4. The disc 10 is arranged at the end of the motor shaft 8' of the electric motor 8, wherein the rotation axis of the motor shaft 8' is equal to the axis of symmetry of the disc 10 and the optical pattern 10', respectively.

FIGS. 5 to 9 show different placements of the rotary angle sensor.

In FIG. 5 the disc 10 is arranged on the steering shaft 3, 4 or rather fixed to the steering shaft 3, 4 in a torque-proof manner. The optical pattern 10' is arranged concentric to the steering shaft 3, 4. The optical sensor unit 9 is fixed to a housing.

FIG. 6 shows the rotary angle sensor arranged so that the sensor detects the torsion between the upper steering shaft 3 and lower steering shaft 4 connected via a torsion bar 19. The optical sensor unit 9 is arranged torque-proof to the upper steering shaft 3 and the disc 10 is rotating with the lower steering shaft 4. The torque sensor is not limited to this arrangement; the optical sensor unit 9 can be likewise fixed to the upper steering shaft and the disk to the lower steering shaft, accordingly. As shown in FIG. 7, in a preferred embodiment of the invention the optical sensor unit 9' apart from the focusing lens 14 is fixed to the housing. The lens 14 is moveable along the rotational axis of the steering shaft on a thread of the upper steering shaft 3. This arrangement translates the steering wheel rotation into linear motion of the focusing lens 14 between the optical sensor unit and the disk 10, which is, as described above, torque-proof fixed to the lower steering shaft 4. The linear motion of the lens 14 results in light attenuation, which can be detected by the photodetector 17 and converted into the position of the focusing lens 14 and a respective absolute angle of the steering wheel 2. Even after a restart of the system, this allows to read out the absolute angle over multiple turns accurately without the need of a revolution counter. In other preferred embodiments the disk 10 or the optical sensor unit 9' are movable with respect to the remaining components of the rotary angle sensor, resulting in the same measurement technique.

FIG. 8 shows that a single optical sensor unit 9 can detect the torsion of the upper and the lower steering shaft 3, 4 with respect to the sensor unit 9 by reading out the information of two discs 10 placed on each steering shaft 3, 4 respectively. FIG. 9 shows that two sensor units 9 can be arranged each reading out one disc arranged on the upper and the lower steering shaft 3, 4. It is also possible to mount the disks 10 directly to the two ends of the torsion bar 19. The two disks 10 are rotating together with steering wheel motion, while having an angular offset relative to their torsion. When arranging the optical pattern 10' of both disks concentrically, the patterns can be read out from the same direction.

Figure 10:
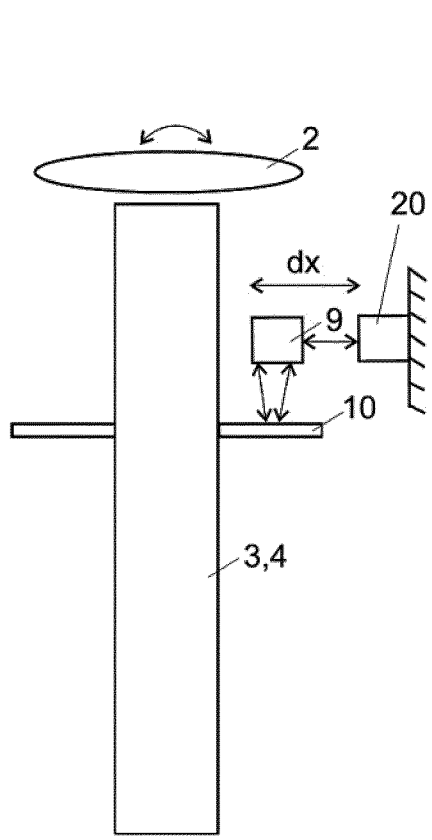
FIG. 10 is a schematic view of the arrangement of a sensor with an actuator to detect rotation of the steering shaft.

In FIG. 10 the optical sensor unit 9 is arranged on an actuator 20. The actuator 20 can move the optical sensor unit 9 in an axially direction dx with respect to the steering shaft 3,4. The torsion of the steering shaft 3,4 is detected by the optical sensor unit 9 by reading out the patterns 10' of the disk 10. The information of the optical sensor unit 9 is transferred back to the actuator 20, so in a failure or when the battery is switched-off, the lower resolution start-up steering angle can be provided by reading back the resolution of the actuator 20.

Figure 11:
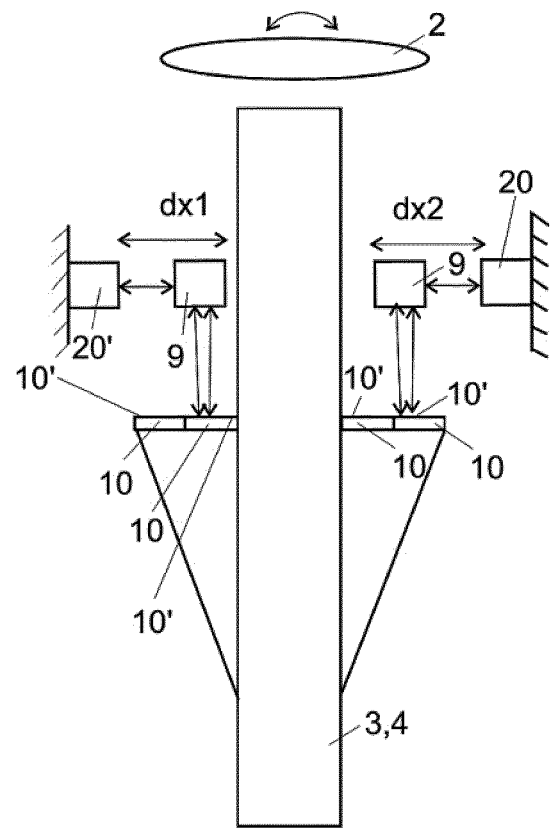
FIG. 11 is a schematic view of the arrangement of two sensors with two actuators to detect the rotation of the upper and lower steering shaft, respectively.

In FIG. 11 two disks 10 are arranged next to each other and connected to the steering shaft 3,4. The optical patterns 10' of each disk 10 are read out by one optical sensor 9 which is moved in an axially or radially direction dx2 to the steering shaft 3,4 by a first actuator 20. The spiral optical patterns 10' of the other disk are read out by a second optical sensor 9 which is moved in an axially or radially direction dx1 by a second actuator 20'. This arrangement provides a multi-turn angle sensing and a start-up steering angle with lower resolution.

Figure 12:
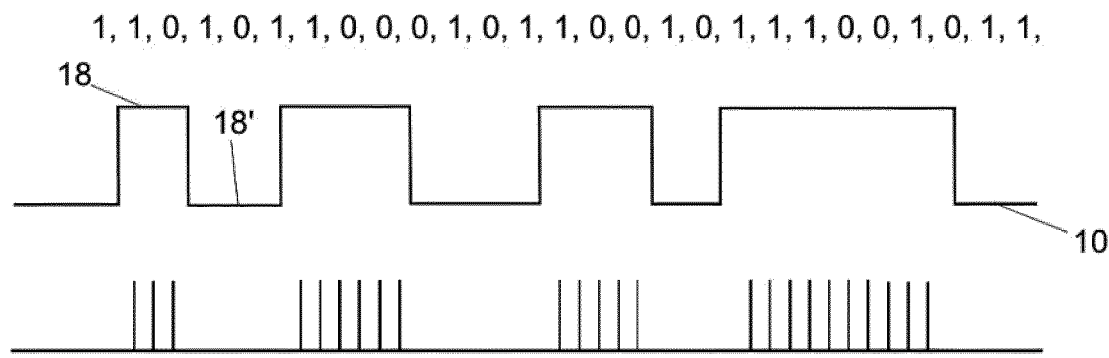
FIG. 12 is a diagram of the optical pattern read out by the sensor.

On the surface of the disc an optical pattern is arranged, which can be seen in FIG. 12. The pattern consists of steps 18 and spaces 18' with different lengths. When the steering shaft 3, 4 rotates, the disc 10 rotates respectively. The optical sensor detects the reflected light and converts it into a binary signal as for example disclosed in DE 33 09 779 A1. This way the absolute angle or the torsion between two shafts can be determined. The resolution of the sensor is highly scalable with adaptation of disk radius and pattern layout.

The disk is preferably made of polymer and coated with material of high reflectivity. The steps 18 and spaces 18' which are embossed on the surface of the plastic substrate are preferably formed by injecting moulding.

The optical sensor unit is preferably based on low cost injection moulded lenses and optics. Redundancy can be introduced by additional optical pattern (tracks) and interrogating optics.

Start-up steering angle can be provided with lower resolution depending on the movement of the optical parts with respect to each other and the sensitivity of the photodetector. This can be further provided by using an actuator.

In order to read out information over more than one full turn, the optical sensor unit is moved in radial direction. The steps 18 are arranged in a spiral. It is further possible to have jumping focal point and/or two layers of optical patterns.

The invention claimed is:

1. A rotary angle sensor for an electric power assisted steering system of a motor vehicle, the sensor comprising:
    an optical sensor unit comprising:
        a light source configured to generate light,
        optical components, and
        a photo detector, and
    a disc comprising an optical pattern, wherein the optical sensor unit and the disc are configured to rotate relative to each other around a rotary axis,
    wherein the optical sensor unit is configured such that the light when reflected from the optical pattern is measured by the photo detector, wherein the optical pattern comprises steps and spaces, the spaces separating the steps, such that light reflected by the steps and spaces destructively interferes leading to an intensity modulation of the reflected light according to the optical pattern that encodes a binary type code for the rotary angle of the disc,
    wherein the rotary angle sensor comprises two parts, which are linearly movable relative to each other along a rotational axis with rotation around that rotational axis in such a way, that linear motion results in light attenuation, which is detectable by the photo detector and converted into the absolute rotary angle of the disc over multiple turns.

2. The rotary angle sensor of claim 1, wherein the steps are arranged in a circle or in a spiral concentric to the rotary axis.

3. The rotary angle sensor of claim 1, wherein the light has a wavelength which is in a range between visible and infrared light.

4. The rotary angle sensor of claim 1, wherein the optical components include a polarizing prism and a quarter wave plate.

5. The rotary angle sensor of claim 1, wherein the steps and the spaces have a different length and transmit a binary type code.

6. The rotary angle sensor of claim 1 wherein one of the two parts is the optical sensor unit that is arranged apart from a focusing lens, which is fixed to a housing, and the other of the two parts is the focusing lens, which is moveable along the rotational axis on a thread of the upper steering shaft.

7. An electric power assisted steering system for assisting steering of a motor vehicle by conferring a support torque generated by an electric motor to a steering mechanism, the electric power steering assisted system comprising:
    a steering column with an upper steering shaft and a lower steering shaft linked by a torsion bar, wherein the electric power steering assisted system further comprises:
a rotary angle sensor with an optical sensor unit comprising:
a light source configured to generate light,
optical components,
a photo detector, and
a disc having an optical pattern,
wherein the optical sensor unit and the disc are configured to rotate relative to each other around a rotary axis, and wherein the optical sensor unit is configured such that the light reflected from the optical pattern is measured by the photo detector, wherein the optical pattern comprises steps and spaces, the spaces separating the steps that are configured such that the light reflected by the steps and the spaces destructively interferes leading to an intensity modulation of the reflected light of the optical pattern which encodes a binary type code for the rotary angle of the disc,
wherein the rotary angle sensor comprises two parts, which are movable relative to each other along a rotational axis with rotation around that rotational axis such that linear motion results in light attenuation, which when detected by the photo detector is converted into the absolute rotary angle of the disc over multiple turns.

8. The electric power assisted steering system of claim 7, wherein one of the two parts is the optical sensor unit which is arranged apart from a focusing lens, which is fixed to a housing and the other of the two parts is the focusing lens, which is moveable along the rotational axis on a thread of the upper steering shaft.

9. The electric power assisted steering system of claim 7, wherein the rotary angle sensor is a torque sensor, wherein the optical sensor unit is arranged to measure the torsion between the upper steering shaft and the lower steering shaft.

10. The electric power assisted steering system of claim 9, wherein the optical sensor unit is disposed torque-proof to the upper steering shaft and the disc rotates with the lower steering shaft, whereby the steps and spaces are arranged in a circle or in a spiral concentric to the rotary axis.

11. The electric power assisted steering system of claim 9, wherein two rotary angle sensors are used to read out a first disc arranged on the upper steering shaft and a second disc on the lower steering shaft, such that the first and second disks rotate together with steering wheel motion, while having an angular offset relative to their torsion.

12. The electric power assisted steering system of claim 11, wherein the optical patterns of the first and second discs are arranged concentrically without overlap.

13. The electric power assisted steering system of claim 7, wherein the rotary angle sensor is a rotor position sensor of the electric motor, wherein the disc is arranged at one end of the motor shaft, and wherein the rotation axis of the motor shaft is equal to the axis of symmetry of the disc and its optical pattern.

* * * * *